(12) United States Patent
Keinonen et al.

(10) Patent No.: US 7,048,456 B2
(45) Date of Patent: May 23, 2006

(54) KEYBOARD ARRANGEMENT

(75) Inventors: Turkka Keinonen, Huhmari (FI);
Harri Wikberg, Helsinki (FI); Miika Silfverberg, Helsinki (FI)

(73) Assignee: Nokia Mobile Phones Ltd., Espoo (FI)

( * ) Notice: Subject to any disclaimer, the term of this patent is extended or adjusted under 35 U.S.C. 154(b) by 63 days.

(21) Appl. No.: 09/750,945

(22) Filed: Dec. 28, 2000

(65) Prior Publication Data
US 2001/0006587 A1  Jul. 5, 2001

(30) Foreign Application Priority Data
Dec. 30, 1999  (FI)  ................... 19992822

(51) Int. Cl.
*B41J 5/08* (2006.01)
*B41J 5/14* (2006.01)

(52) U.S. Cl. ............... 400/495; 400/480; 400/484; 400/489; 400/490; 400/494

(58) Field of Classification Search ............ 400/484, 400/485, 489, 495, 490, 480, 494
See application file for complete search history.

(56) References Cited

U.S. PATENT DOCUMENTS

| | | | | |
|---|---|---|---|---|
| 4,449,839 A | | 5/1984 | Bleuer | 400/485 |
| 5,137,383 A | * | 8/1992 | Wong | 400/484 |
| 5,336,002 A | * | 8/1994 | Russo | 400/489 |
| 5,367,298 A | * | 11/1994 | Axtheim | 341/22 |
| 5,497,151 A | * | 3/1996 | Dombroski | 341/22 |
| 5,818,437 A | * | 10/1998 | Grover et al. | 345/326 |
| 5,844,561 A | * | 12/1998 | Tanimoto et al. | 345/357 |
| 5,852,414 A | * | 12/1998 | Yu et al. | 341/22 |
| 5,977,948 A | * | 11/1999 | Nishibori | 345/141 |
| 6,307,549 B1 | * | 10/2001 | King et al. | 345/352 |
| 6,348,878 B1 | * | 2/2002 | Tsubai | 341/23 |

FOREIGN PATENT DOCUMENTS

| | | |
|---|---|---|
| EP | 0595114 A1 | 5/1994 |
| EP | 0712144 A2 | 5/1996 |
| WO | WO 97/05541 | 2/1997 |
| WO | WO 99/37025 | 7/1999 |

* cited by examiner

*Primary Examiner*—Andrew H. Hirshfeld
*Assistant Examiner*—Marvin P. Crenshaw

(57) ABSTRACT

The invention relates to a keyboard arrangement and a method for detecting an input character. In particular the invention relates to a method and arrangement for reducing the number of keys in a QWERTY-keyboard (20) or the like. One idea of the invention is to provide keys (210) with several characters and to provide alternative ways to press the key for entering a selected one of the alternative characters. The keys are preferably triangular or have three arms, and one of three characters can be selected by pressing the corresponding corner/arm of the key. The keyboard may preferably be formed of interlaced rows of keys. Linguistic disambiguation is advantageously used in addition to said mechanical disambiguation. The invention is well suited for mobile station keyboards.

18 Claims, 4 Drawing Sheets

KEYBOARD ARRANGEMENT

The invention relates to a keyboard arrangement and a method for detecting an input character. In particular the invention relates to a method and arrangement for reducing the number of keys in a QWERTY-keyboard or the like.

Mobile phones are nowadays used except for transferring speech, also for transferring data such as written text messages. Additionally Internet applications requiring text input are increasingly used with mobile phones and mobile stations used as mobile terminals. Transmitting text information requires a possibility to input letters and special symbols in addition to inputting numbers. On the other hand, as the mobile stations are made very small the number of keys must be minimised. Therefore the transmission of character based data sets high requirements for the ergonomy of the keyboard.

In prior art phones the keys that are reserved for the numerals are usually also used for inputting letters and symbols. For this purpose there are three or four letters marked on each numeric key in addition to the number. The letters are usually in the alphabetical order. Inputting letters is generally done in the following way:

Pressing a specific key of the mobile station sets the keypad into a mode for inputting letters. After this, when a number/letter key is pressed for the first time this causes the first letter that is marked on the key to be entered into the memory and display of the mobile station. If the key is then quickly pressed for a second time, the letter in the memory and in the display is changed into the second letter that is marked on the key. If the key is quickly pressed for the third time the letter in the memory and in the display is changed into the second letter that is marked on the key. If after pressing the key the user waits for a predetermined time the letter shown on the display is determined to be the input letter, and the mobile station then starts to expect the next letter input. This way it is possible to input any of the letters that are marked on the key by quickly pressing the key one, two or three times. There may also be other characters and symbols that can be selected with further quick presses of a key.

This prior art solution has certain drawbacks. Firstly, inputting one letter requires many presses of a key depending on the character to be input. Secondly, one must wait for at least a predetermined time period between inputting two letters with the same key. In concequence the writing becomes slow and errors in the input text may easily appear.

One known solution for these prior art problems is applying a disambiguating system for a keyboard where a plurality of characters is assigned to each key. A disambiguation system is employed to decipher the correct input based on linquistic rules and/or word vocabularies. The suggested input character can be confirmed by the user, or alternatively the user may use a multistroke method to identify the desired character in the key. The prior art solution is disclosed in the PCT patent application document WO 97/05541, and it is here taken as reference for the prior art.

There are also problems with the prior art linguistic disambiguation systems. Firstly, they are known to be somewhat unreliable; the user ofter has to correct the input that is suggested by the system. And further, a very comprehensive linguistic disambiguation system would impose hefty requirements for the memory of the device, which uses the keyboard as a user interface. Prior art keyboards with reduced numbers of keys are also prone to be counterintuitive to some users.

The objective of the present invention is to reduce or remove the aforementioned disadvantages of the prior art solutions.

One idea of the invention is to provide keys with several characters and to provide alternative ways to press the key for entering a selected one of the alternative characters. The keys are preferably triangular or have three arms, and one of three characters can be selected by pressing the corresponding corner/arm of the key. The keyboard may preferably be formed of interlaced rows of keys. Linguistic disambiguation is advantageously used in addition to said mechanical disambiguation to increase the reliability.

In an exemplary embodiment of the invention a QWERTY keyboard comprises triangular keys which may be stroked in multiple locations. Depending on which corner receives most of the pressure of the stroke, the mechanical input is determined. Linguistic disambiguation is then employed as a backup to ensure that the character output of the device is the one desired by the user.

With the present invention it is possible to provide a reliable disambiguating system with moderate memory requirements. The keyboard arrangement in accordance with the invention also establishes the mechanical design of the keyboard in an aesthetic, compact and user-friendly way. The design of the invention also allows for a robust structure.

A keyboard arrangement in accordance with the invention including several keys for inputting characters by pressing the keys, and wherein at least one key is used for entering at least two different characters, is characterised in that it comprises means for detecting alternative sectional distributions of pressure on the at least one key, and means for deducing the input character based on said distribution of pressure on the key.

A method according to the invention for inputting characters with a keyboard, is characterised in that
  at least one key is pressed in one of at least two alternative ways,
  the way the key is pressed is detected, and
  the input character is determined of at least two alternative input characters based on the detected way the key is pressed.

Some preferred embodiments of the invention are disclosed in the dependent claims.

In the following the invention will be described in greater detail with reference to exemplary embodiments in accordance with the accompanying drawings, in which FIG. 1 shows a first embodiment of the keyboard layout in accordance with the invention.

Figure 4:
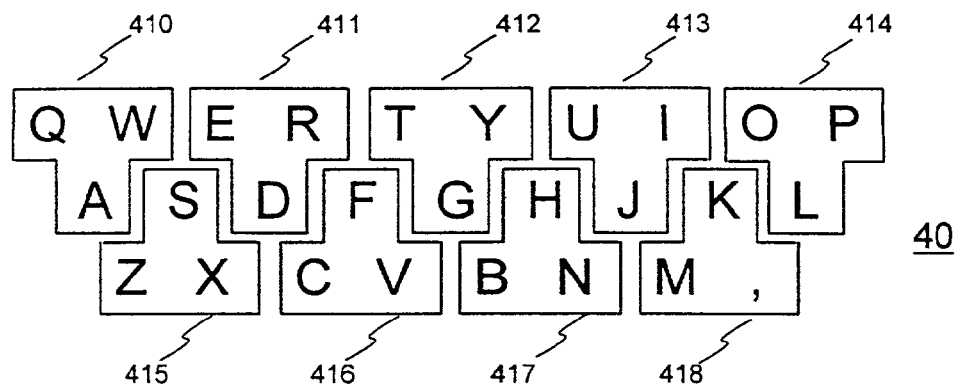
Figure 5:
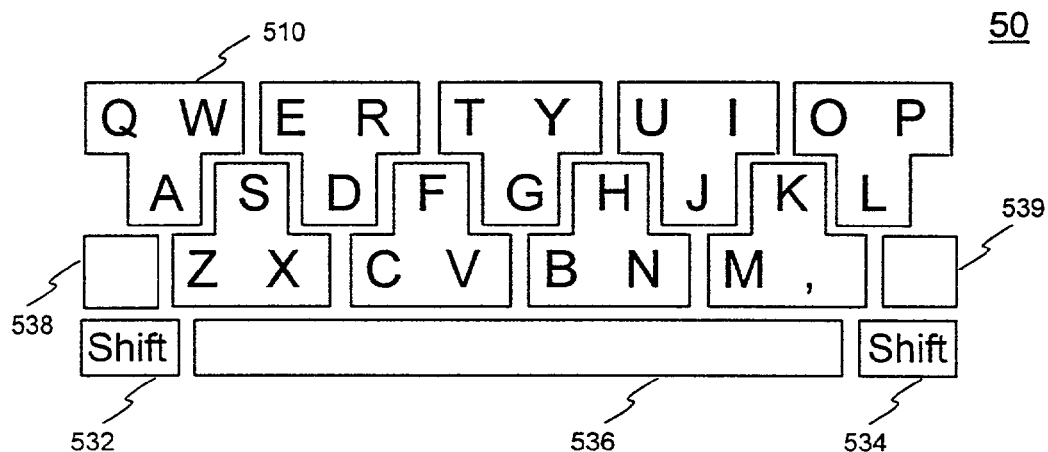
Figure 6:
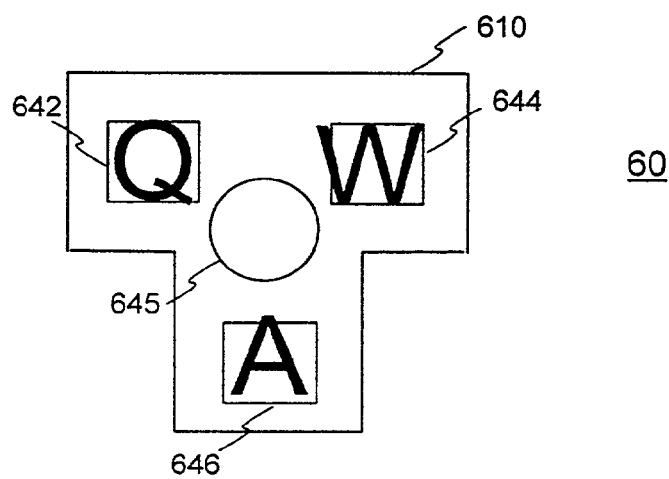
Figure 7:
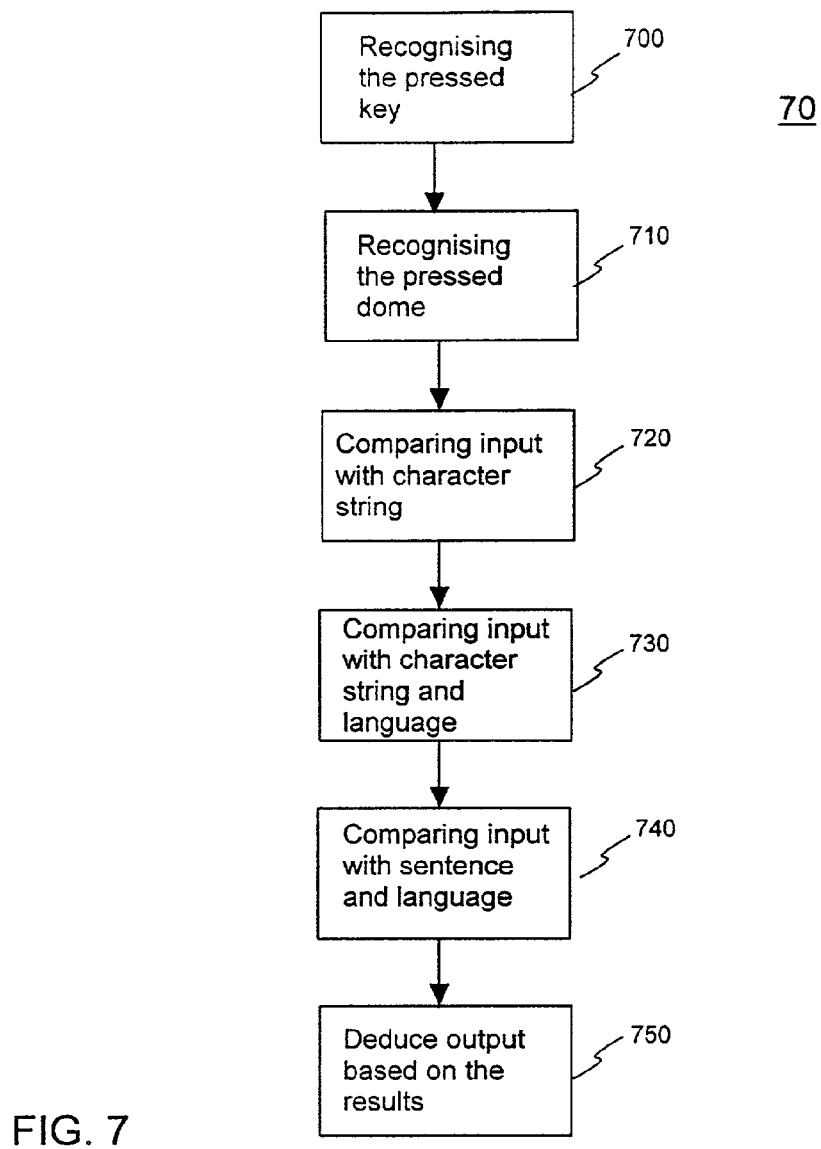
Figure 9:
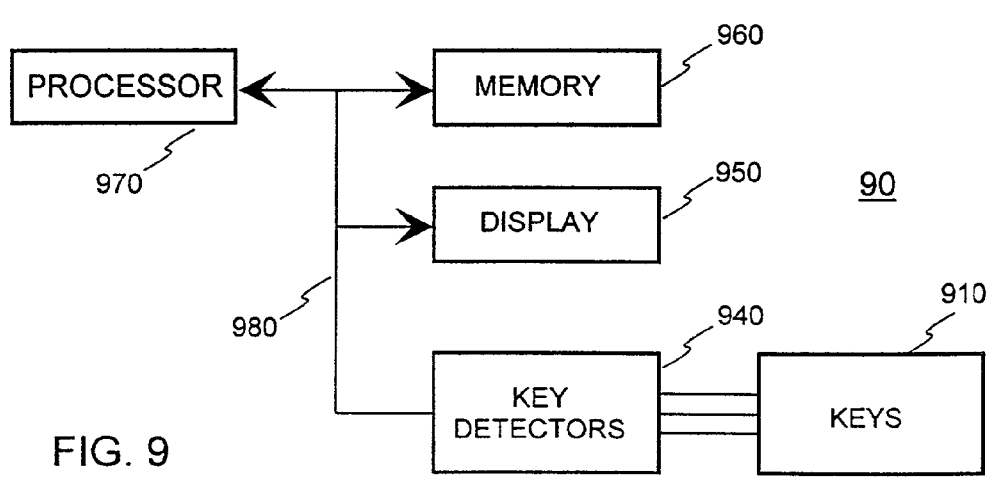
Figure 8:
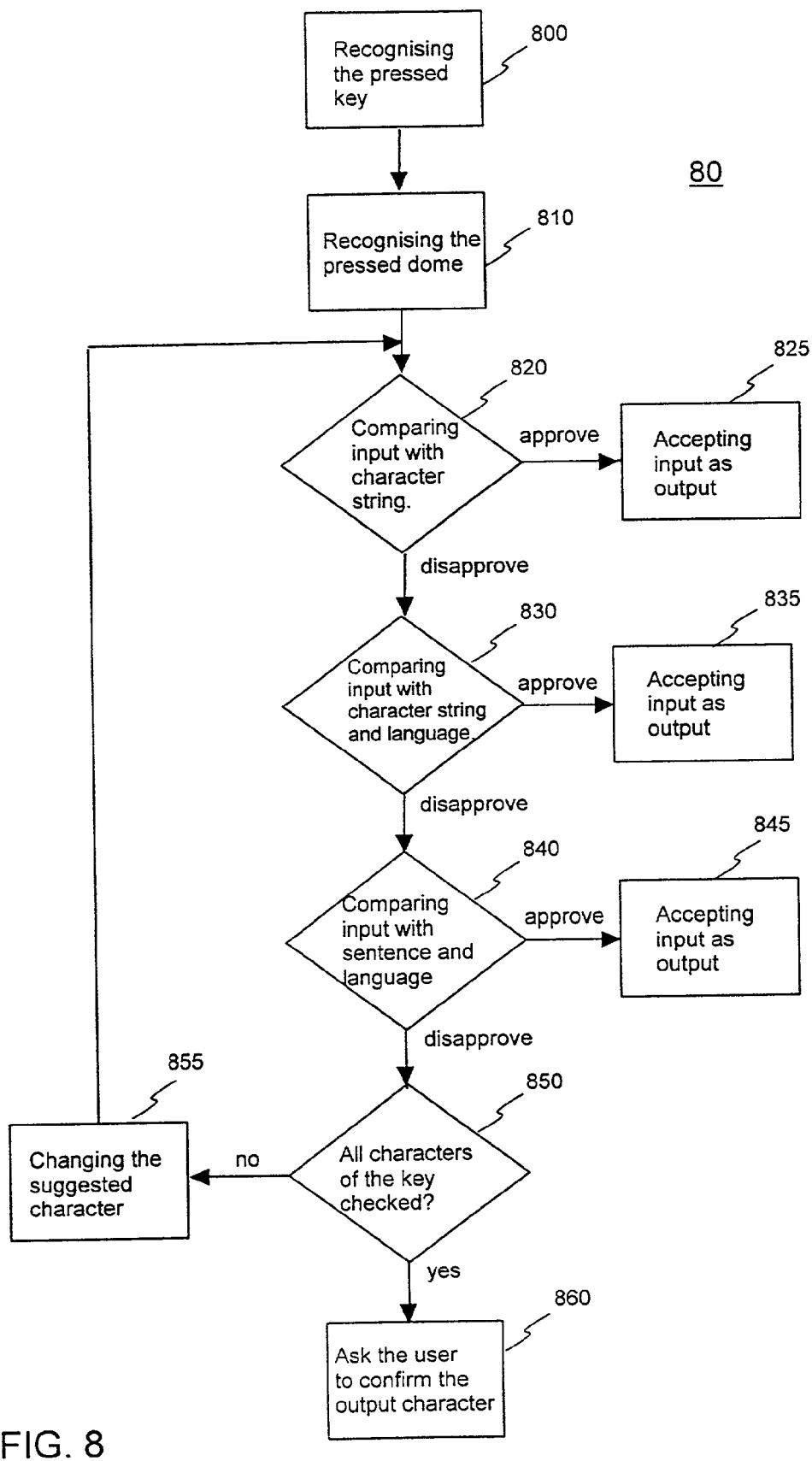

FIG. 4 shows a third embodiment of the keyboard layout in accordance with the invention, FIG. 5 shows a fourth embodiment of the keyboard layout in accordance with the invention, FIG. 6 shows a a key usable in the keyboards of FIGS. 4 and 5, FIG. 7 shows a flow diagram of an examplary method for detecting an input character in accordance with the invention, FIG. 8 shows a flow diagram of another examplary method for detecting input characters in accordance with the invention, and FIG. 9 shows a partial block diagram of an exemplary mobile station or computer in accordance with the invention.

Figure 1:
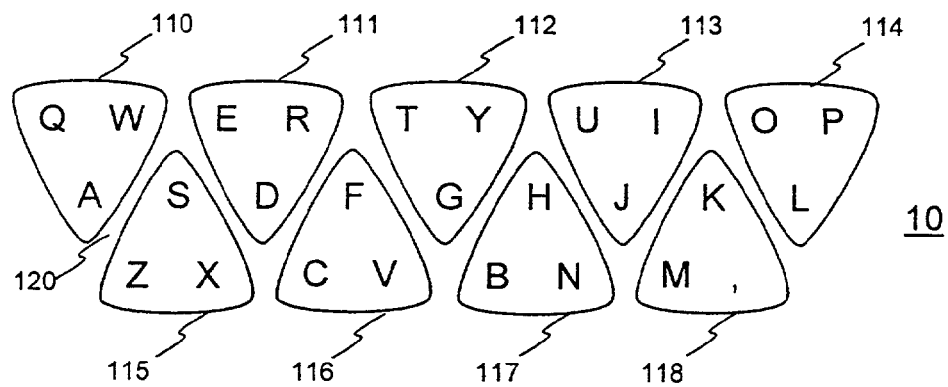

FIG. 1 illustrates an example of a QWERTY character keyboard 10 with triangular keys 110–118 according to the invention. Each key has three characters marked in the corners of the key. The keys are close to each other, leaving a narrow space 120 in between, which can be a gap or may contain plastic or any other material that partially supports the keys. This material is advantageously part of the equipment housing.

The keys are further arranged in two lines in such a way that the characters form three lines. The first line of characters (QWERTY . . . ) are marked in the upper line of keys, and the third line of characters (ZXCVB . . . ) are marked in the lower line of keys. The second or middle line of characters (ASDFG . . . ) are marked in the lowest corners of the upper line of keys and in the uppermost corners of the lower row of keys.

The design of this keyboard is very aesthetic and compact compared to the design of normal keyboards with square keys while it still preserves the qwerty letter layout most users are familiar with.

Figure 2:
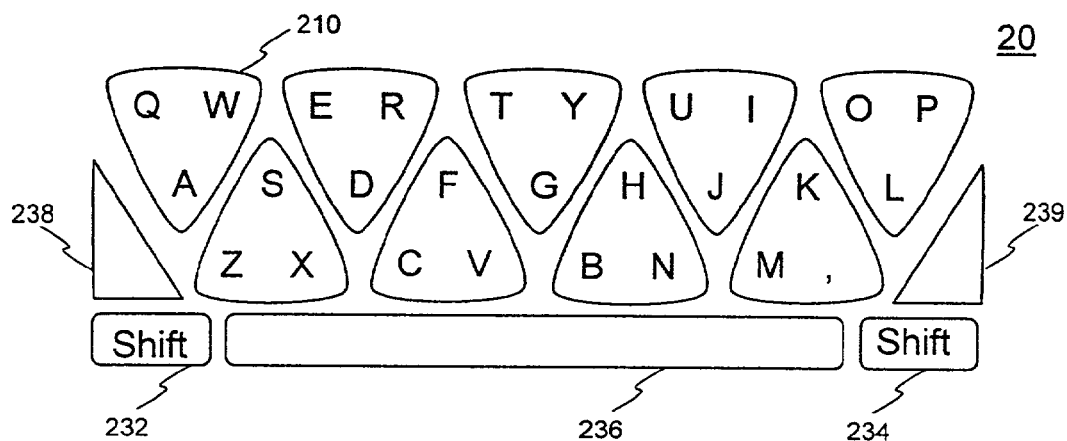
FIG. 2 shows a second embodiment of the keyboard layout in accordance with the invention.

FIG. 2 illustrates a character keyboard 20 with character keys 210 and exemplary additional functional keys. Key 236 is preferably the space bar, keys 232 and 234 the shift keys, 239 the enter-key and 238 any optional key, like the Tab. The addition of functional keys 232–239 is arranged to establish the full key layout required for an ordinary user interface.

Figure 3:
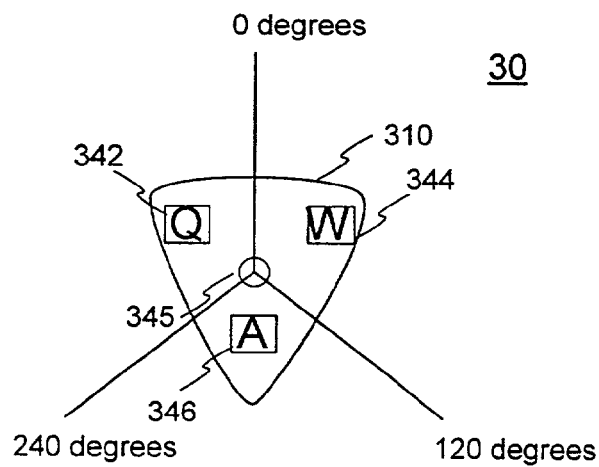
FIG. 3 shows a key usable in the keyboards of FIGS. 1 and 2.

FIG. 3 illustrates the mechanical disambiguation arrangement 30 for a single triangular key 310. The key is connected to the equipment base from the middle 345 of the key so that the key can swing relative to the attachment point. Whichever of the sectors of 120 degree receives the most pressure from the users keystroke, is judged as the intended mechanical input. In one preferable embodiment, each sector comprises their own pressure sensitive detector 342, 344 and 346, also referred to as "dome." The dome with the majority input pressure, is arranged to form the output. Another possibility is to equip the attachment point 345 with position/movement sensors that measure the slope of the key. Another preferable method is to use a touch sensitive keyboard surface and to determine for each pressed key the "dome" that has the greatest touched area.

FIG. 4 illustrates a further exemplary embodiment 40 of the QWERTY-letter keyboard arrangement according to the invention. The keys 410–418 are T-shaped and they are arranged in two parallel rows with the second row vertically reversed. This allows for space conservation and robustness. The three characters of each key are marked one in each end of the T-shaped key.

FIG. 5 illustrates a character keyboard 50 with character keys 510 and exemplary additional functional keys. Key 536 is preferably the space bar, keys 532 and 534 the shift keys, 539 the enter-key and 538 any optional key, like the Tab. The addition of functional keys 532–539 is arranged to establish the full key layout required for an ordinary user interface.

FIG. 6 illustrates an example for an individual key arrangement 60 featured in the keyboards 40 and 50. In one embodiment, the wing from the T-shape of the key 610 that receives the most input pressure wins the output. Each wing may comprise their own pressure sensitive detector 642, 644 and 646. The key 610 may be fastened on a ball bearing 645. In this embodiment the wings are arranged to detect the degree of tilt they receive in a stroke. The wing with the most tilt is determined to correspond to the intended input character.

FIG. 7 illustrates a flow diagram of an embodiment 70 of the method in accordance with the invention. In phase 700 the pressed key is recognised based on the pressure detector(s) of the keys. In phase 710 the dome experiencing the most pressure and/or inclination of the pressed key is recognised. Correspondingly, when a touch sensitive surface is used, the "dome" experiencing the greatest touched area is recognized.

Once the mechanical input is recognised, it is subjected to linguistic disambiguation. Firstly the input is compared with character string in phase 720 in order to determine the suitability of the input to the previously selected character string. Next the input is compared with both the character string and language in phase 730 in order to determine the suitability of the input to the previously selected character string and language including words and rules of the concerned language. Then the input is further compared with sentence context, syntax and/or structure and language in phase 740. When comparisons are made with language in phases 730 and 740 the comparisons preferably include comparisons to available official vocabularies, like to the Oxford-Cambridge unabridged dictionary of English language, to idioms, paragraph content and/or to the general field of the piece of writing. The "input" in phases 720–740 means the character correspondoing to the recognised dome and the other characters of the recognised key.

Lastly the output is deduced in phase 750 based on the recognising results of phases 700–710 (the mechanical disambiguation) and the comparison results of phases 720–740 (the linguistic disambiguation).

FIG. 8 illustrates a flow diagram of another embodiment 80 of the inventive method. As in the previous embodiment of FIG. 7, the pressed key is first recognised based on the pressure detector(s) of the keys in phase 800. In phase 810 the dome experiencing the most pressure, touch or inclination is recognized.

The linguistic disambiguation is then started by comparing the suggested character with character string in phase 820 in order to determine the suitability of the input to the previously selected character string. Based on the result of the comparison the suggested character approved or disapproved in phase 820. If the suggested character is approved, it is accepted as the output character. But if the character is disapproved, a further linguistic comparison is made in phase 830.

In phase 830 the input is compared with both the character string and language in order to determine the suitability of the input to the previously selected character string and language including words and rules of the concerned language. Based on the result of the comparison the suggested character approved or disapproved in phase 830. If the suggested character is now approved, it is accepted as the output character. But if the character is again disapproved, a further linguistic comparison is made in phase 840.

In phase 840 the input is further compared with sentence context, syntax and/or structure and language. Based on the result of the comparison the suggested character approved or disapproved in phase 840. If the suggested character is now approved, it is accepted as the output character. But if the character is still disapproved, it will be checked, whether linguistic disambiguation is made with all characters of the pressed key. If no, another character corresponding to the pressed key is selected in phase 855 for further comparisons, starting again from phase 820. However, if linguistic disambiguation is made with all characters of the pressed key, the user may be asked to verify the correct intended character, phase 860.

So based on whether the comparisons in phases 820, 830 and 840 approve or disapprove the suggested input character, the logic of the linguistic disambiguation can be directed from one phase to another. In this embodiment, whenever approval is granted from the disambiguation program the input is accepted. Whenever the linguistic disambiguation phase disapproves the input, further confirmation is sought from the next stages of the analysis.

It is clear, that even after an approval, further confirmation may be sought from other stages of disambiguation in some embodiments. Likewise it is clear, that even after a disapproval, acceptance may be granted to the input in some embodiments.

Finally, the linguistic disambiguation method may either accept the input as output without any changes 820–840, deduce the output 750, or fail the input as output 860. In one preferable embodiment, if the program has to deduce the output, it confirms and/or indicates its deduction to the user by asking for acceptance, or by e.g. displaying a small indication, like a red underlining under the changed character. If the program fails the input as the output 860, the linguistic disambiguation program may ask the user for another input.

FIG. 5 illustrates some important parts of a device according to the invention in a block diagram, 90. The device comprises a processor 970 to control the other units of the device. The processor executes a program that is stored in a memory 960. The memory may also store the recognition and comparison results according to the invention as well as the data that is input by the user. The memory may also store the linguistic rules and vocabularied that are required in the linquistic disambiguation. The memory may include a PROM section for storing programs, rules and parameters, and a RAM section for storing results and user data.

A display 950 shows the input/output information according to the invention. The keys 910 of the keyboard are connected to key detectors 940, such as pressure, touch or position sensors, which give an output to the processor for recognising the pressed key and dome. The data and signals between the units of the device can be conveyed via an internal data bus 980, for example.

The invention has been described above with reference to several embodiments. Several substantial advantages of the invention have been demonstrated. These advantages can be realised in embodiments where the inventive method and arrangement are employed, for example, in a GSM-(Global System for Mobile Communications), UMTS-(Universal Mobile Telecommunications System), Iridium-, Inmarsat- and/or Teldesic-mobile station. The invention can also be implemented to computers, like PC (Personal Computer) palm-, notebook or laptop computers.

The invention has been explained above with reference to the aforementioned embodiment. However, it is clear that the invention is not only restricted to these embodiments, but comprises all possible embodiments within the spirit and scope of the inventive idea and the following patent claims.

For example, one should note that the idea of implementing linguistic disambiguation in a QWERTY keyboard with reduced number of keys with several characters each.

What is claimed is:

1. A keyboard arrangement including several keys for inputting characters by pressing the keys, the keyboard arrangement comprising:
   at least one key actuable in at least two different ways depending on a pressure distribution thereon;
   a detector for detecting the pressure distribution on the at least one key, wherein predetermined characters are related to each of the at least one keys, and at least one of the predetermined characters of a pressed key is first selected on the basis of a sectional pressure distribution of the pressed key; and
   a processor operable to perform a first comparison of a combination of previously inputted characters and the at least one first selected characters to a storage of words of a defined language, and to accept one of the at least one first selected characters as a desired character if the first comparison is successful,
   wherein the processor is further operable to automatically perform a second comparison of a combination of previously inputted characters and at least one character that is related to the pressed key and not one of the first selected characters and not indicated by said sectional pressure distribution to the storage of words if and only if the first comparison is unsuccessful.

2. The keyboard arrangement of claim 1, wherein the first and second comparisons include performing linguistic disambiguation.

3. The keyboard arrangement of claim 1, further comprising substantially a QWERTY-keyboard.

4. The keyboard arrangement of claim 1, wherein the detector includes at least two pressure sensitive and/or touch sensitive detectors attached to different locations of the key.

5. The keyboard arrangement of claim 1, wherein the detector includes a movement sensitive detector attached to the key.

6. The keyboard arrangement of claim 1, wherein the at least one key is triangular in shape or has three arms.

7. The keyboard arrangement of claim 6, wherein the detector includes means for detecting the pressure of the alternative corners/arms of the key.

8. A keyboard arrangement in accordance with claim 1, characterised in that the keys form two rows of keys and the keys of the two rows are interlaced.

9. A keyboard arrangement in accordance with claim 8, characterised in that the keys form a first row of keys and a second row of keys, the two rows of keys comprising three rows of characters marked on the keys, wherein the upmost row of characters is marked to the first row of keys, the middle row of characters is marked alternately to the first and the second row of keys and the lowest row of characters is marked to the second row of keys.

10. A keyboard in accordance with claim 1, characterised in that it is a keyboard of a mobile station.

11. A keyboard in accordance with claim 1, characterised in that it is a keyboard of a computer.

12. A method for inputting characters with a keyboard comprising:
   relating predetermined characters to each of one or more keys;
   first selecting at least one of the predetermined characters on the basis of a sectional pressure distribution of a pressed key;
   comparing a combination of previously inputted characters and the at least one first selected characters to a set of stored words;
   accepting one of the at least one first selected characters as a desired character if the comparison of a combination of that character and previously inputted characters to the set of stored words is successful;
   automatically selecting a second character that is one of the predetermined characters related to the pressed key and not one of the first selected characters and not indicated by said sectional pressure distribution if and only if the comparison of the combinations of previously inputted characters and the first selected characters to the set of stored words is unsuccessful, and performing a comparison of a combination of previously inputted characters and said second character to the set of stored words.

13. The method of claim 12, wherein the pressure distribution is provided by pressing alternative corners or arms of a key.

14. The method of claim 12, wherein comparing the combination of previously inputted characters and the at least one first selected characters to the set of stored words comprises applying an algorithm based on comparison with at least one of known vocabulary, probability of successive characters, frequency of words in language, sentence structure, topic or paragraph context.

15. The method of claim 12 applied with a QWERTY-keyboard.

16. The method of claim 12, wherein the key is on a mobile station.

17. The method of claim 12, wherein the key is on a computer.

18. A method for recognizing a character from a pressed key on a keyboard comprising:

recognizing the pressed key based on pressure on the pressed key;

suggesting a first character from a plurality of characters assigned to the pressed key as a result of a pressure distribution on the pressed key;

performing a first comparison of the suggested character to a character string to determine if the identified character is suitable with a previously selected character string;

performing a second comparison of the suggested character to the character string and to words and rules of a language to determine if the suggested character is suitable with the previously selected character string and the words and rules of the language;

performing a third comparison of the suggested character to at least one of sentence context, syntax, structure and language to determine if the suggested character is suitable with the at least one of sentence context, syntax, structure and language; and automatically accepting the suggested character as the recognized character on the basis of the recognition of the pressed key, the pressure distribution of the pressed key, and the first, second, and third comparisons.

* * * * *